(12) United States Patent
Ko

(10) Patent No.: US 6,345,643 B1
(45) Date of Patent: Feb. 12, 2002

(54) FAUCET VALVE CHAMBER BODY

(75) Inventor: Hsi Chia Ko, Changhua Hsien (TW)

(73) Assignee: Chung Cheng Faucet Co. Ltd. (TW)

( * ) Notice: Subject to any disclaimer, the term of this patent is extended or adjusted under 35 U.S.C. 154(b) by 0 days.

(21) Appl. No.: 09/827,147

(22) Filed: Apr. 6, 2001

(51) Int. Cl.$^7$ ............................. F16K 27/06; B21K 1/24; F16L 5/00

(52) U.S. Cl. .............................. 137/315.12; 29/890.12; 29/890.141; 4/678; 137/359; 137/360; 137/454.5; 137/801

(58) Field of Search ............................ 4/676, 677, 678; 137/315.01, 315.11, 315.12, 359, 360, 454.2, 454.5, 454.6, 801, 15.17, 15.18; 29/890.12, 890.121, 890.122, 890.141

(56) References Cited

U.S. PATENT DOCUMENTS

| | | | | |
|---|---|---|---|---|
| 1,315,828 A | * | 9/1919 | Gillette | 137/360 |
| 1,541,558 A | * | 6/1925 | Gade | 137/360 |
| 3,006,361 A | * | 10/1961 | Reinemann | 137/454.5 |
| 4,662,389 A | * | 5/1987 | Igbal | 137/359 |
| 4,699,170 A | * | 10/1987 | Diephuis et al. | 137/454.5 |
| 5,031,877 A | * | 7/1991 | Mercer | 137/359 |
| 5,232,008 A | * | 8/1993 | Jeffress et al. | 137/359 |
| 5,257,645 A | * | 11/1993 | Scully et al. | 137/359 |
| 5,947,149 A | * | 9/1999 | Mark | 137/359 |
| 6,014,985 A | * | 1/2000 | Warshawsky | 4/677 |

* cited by examiner

*Primary Examiner*—George L. Walton
(74) *Attorney, Agent, or Firm*—Troxell Law Office PLLC (57) ABSTRACT

Faucet valve chamber body composed of a controlling valve body, an inlet tube, a main tube body and an outlet/inlet sleeve. The valve chamber body is assembled with a handle, a casing, an upper clamping block, a washer, a sealing ring and a lower clamping block. An upper end of the controlling valve body is provided with a driving rod milled with a casing outer thread section and a stepped stop block. A lower portion of the controlling valve body is milled with a locking outer thread section. The inlet tube is milled with an internal inlet tunnel and an upper annular engaging section. A middle portion of the inlet tube is milled with a stepped section to which an annular flow-guiding rib is adjacent. A lower end of the inlet tube is milled with locking outer thread section. The main tube body is milled with an internal receiving tunnel. Inner circumference of the upper end of the receiving tunnel is formed with a locking inner thread section. Near lower end of the receiving tunnel, the inner circumference of the receiving tunnel is formed with an annular stop section. Outer circumference of the main tube body is formed with a main outer thread section. A lower side of the main outer thread section is milled with a fastening outer thread section. A center of the outlet/inlet sleeve is formed with a stepped adapting flow passage. A large diameter section thereof is formed with a fastening inner thread section and a small diameter section thereof is formed with a locking inner thread section. A lower side of the outlet/inlet sleeve is formed with an inlet tube and a lateral side thereof is formed with an outlet tube.

3 Claims, 6 Drawing Sheets

FAUCET VALVE CHAMBER BODY

BACKGROUND OF THE INVENTION

The present invention is related to a faucet valve chamber body in which the inlet tube and the main tube body are both made by milling. Therefore, the inner and outer surfaces thereof have good precision and are free from any sand hole. When mounting the valve chamber body on bath tubs or washing basins with different wall thickness, it is only necessary to mill the inlet tube and main tube body with a length meeting the wall thickness thereof. Therefore, it is unnecessary to manufacture a number of molds so that the cost is greatly lowered.

Figure 1:
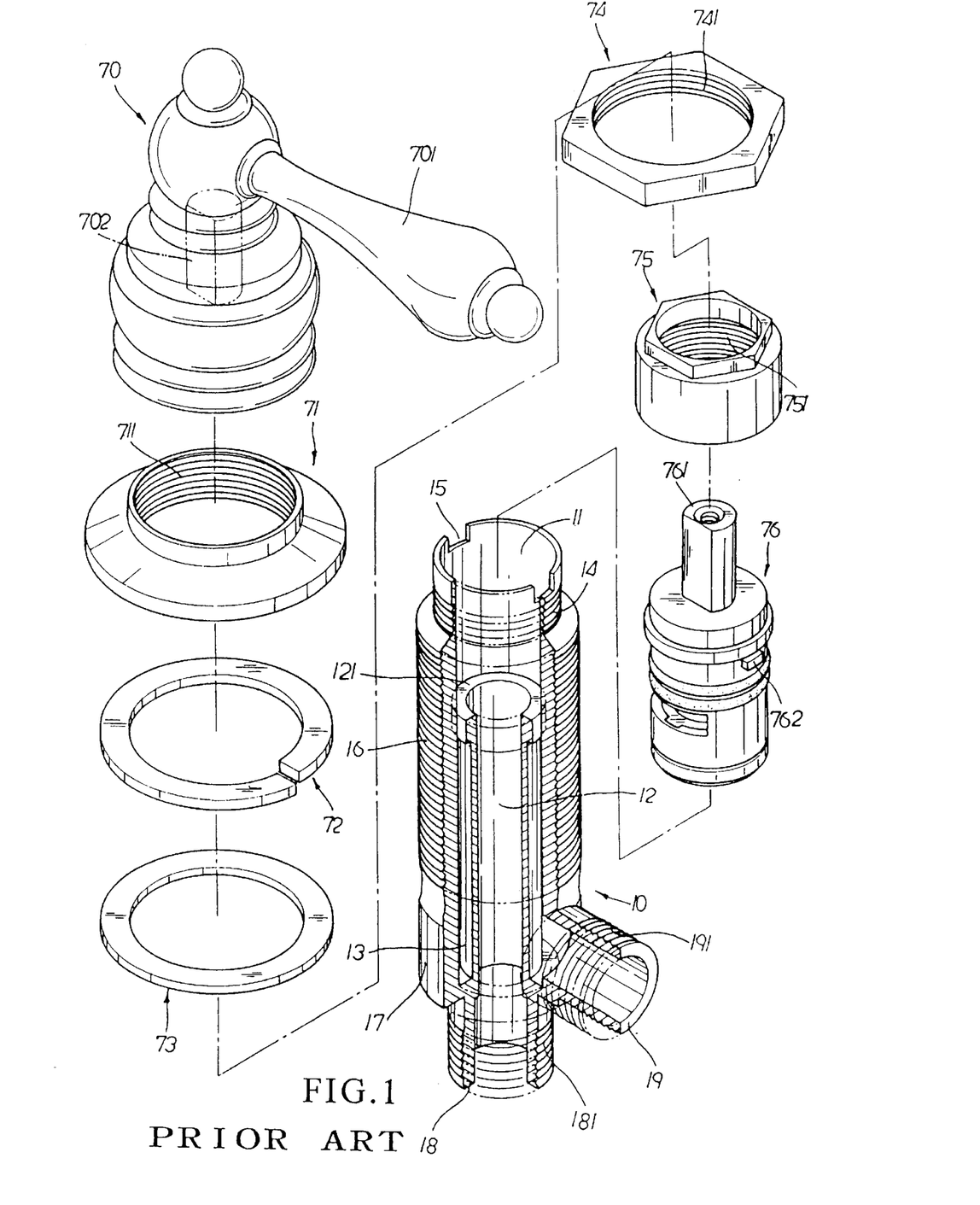
FIG. 1 is a perspective exploded view of a conventional faucet valve chamber body.

FIG. 1 shows a conventional faucet valve chamber structure installed on a bath tub or a washing basin. The faucet valve chamber structure includes a valve chamber body 10, a handle seat 70, an upper clamping block 71, a resilient washer 72, a sealing ring 73, a lower clamping block 74, a fitting cap 75 and a controlling valve 76. The valve chamber body 10 is a hollow body made by integral casting and formed with a T-shape. The upper end is formed with a valve chamber 11 with a certain depth. The middle portion is provided with an integrally extending inlet tunnel 12. A step section 121 with larger diameter is formed between the upper end of the inlet tunnel 12 and the valve chamber 11. The circumference of the step section 121 and the inlet tunnel 12 is spaced from the inner wall of the valve chamber body 10 to define an annular outlet passage 13. The upper end of the valve chamber body 10 is formed with an outer thread section 14 with smaller diameter. The edge of the upper opening of the valve chamber body 10 is cut with two opposite locating notches 15. The middle portion of the valve chamber body 10 is formed with a main outer thread section 6 with a certain length. An outlet/inlet sleeve 17 is adjacent to lower end of the main outer thread section 16. A lower side of the outlet/inlet sleeve 17 is formed with an inlet tube 18 and a lateral side thereof is formed with an outlet tube 19. The inlet tube 18 and outlet tube 19 respectively communicate with the inlet tunnel 12 and the annular outlet passage 13. The outer circumference of the end of the inlet tube 18 is formed with an inlet outer thread section 181. The outer circumference of the end of the outlet tube 19 is formed with an outlet outer thread section 191. A lever handle 701 is disposed on one side of the handle seat 70. The handle seat 70 is formed with internal controlling cavity 702. The upper and lower clamping blocks 71, 74 are formed with central main thread holes 711, 741. The fitting cap 75 is formed with a central stepped hole with larger lower section and smaller upper section. The wall of the larger section is formed with an inner thread section 751. The upper end of the controlling valve 76 is provided with a controlling boss 761 for fitting into the cavity 702 of the handle seat 70. The outer circumference of the controlling valve 76 is formed with two opposite locating projecting blocks 762.

According to the above arrangement, the conventional structure has some shortcomings as follows:

1. The valve chamber body 10 is made by integral casting. After cast, it is impossible to process the wall surfaces of the inlet tunnel 12 and the narrow annular outlet passage 13. Therefore, the precision of the surfaces of the walls of the inlet tunnel 12 and the annular outlet passage 13 will be very poor. As a result, the rough surfaces will affect the water flow and result in unsmooth discharge of water.
2. After cast, sand holes will more or less leave on the inner and outer surface of the valve chamber body 10. The outer, surface can be further processed to remove the sand holes. However, it is impossible to remove the sand holes formed on the walls of the inlet tunnel 12 and the annular outlet passage 13. Moreover, the sand holes will pass through the wall between the inlet tunnel 12 and the annular outlet passage 13. This leads to leakage of water from the valve chamber body 10.
3. The valve chamber body 10 is made by integral casting. After cast, it is hard to process the inner wall of the valve chamber body 10. Moreover, the annular outlet passage 13 is in a nearly close state and can be hardly visually checked. Therefore, the ratio of good products is relatively low and defective products may be sold on market to affect the reputation of the manufacturer.
4. Bath tubs or washing basins 80 have varied thickness of walls.

Therefore, it is necessary to manufacture multiple sets of molds for producing different sizes of valve chamber bodies 10 to meet the wall thickness of the bath tubs or washing basins. This increases cost for the molds and relatively lowers profit.

5. The handle seat 70 cannot be entirely attached to the upper plane face of the bath tub or washing basin 80. Therefore, when the handle seat 70 is damaged and needs to be replaced, it is necessary to replace the upper clamping block 71 together with the handle seat 70. When replacing the upper clamping block 71, the valve chamber body 10 is not located on upper side and will drop down. After dropping, it is necessary to again lock the valve chamber body 10. This procedure is troublesome.
6. When replacing the handle seat 70, it is necessary to replace the upper clamping block 71 together with the handle seat 70. This leads to waste of resource and increased cost.

SUMMARY OF THE INVENTION

It is therefore a primary object of the present invention to provide an improved faucet valve chamber body. The inlet tube and the main tube body are both made by milling. Therefore, the inner and outer surfaces thereof are polished faces without roughness so that the water flow will not be affected and the water can be smoothly discharged.

It is a further object of the present invention to provide the above faucet valve chamber body in which the inlet tube and the main tube body are both made by milling. Therefore, the inner and outer surfaces thereof are free from any sand hole as resulted from casting. Therefore, when the water is shut off, the water is prevented from leaking from the sand holes.

It is still a further object of the present invention to provide the above faucet valve chamber body in which the inlet tube, the main tube body and the outlet/inlet sleeve of the valve chamber body are first respectively processed and then assembled. Therefore, prior to assembly, these parts can be visually entirely checked. Therefore, defective products can be sorted.

It is still a further object of the present invention to provide the above faucet valve chamber body in which when mounting the valve chamber body on bath tubs or washing basins with different wall thickness, it is only necessary to mill the inlet tube and main tube body with a length meeting the wall thickness thereof. Therefore, it is unnecessary to manufacture a number of molds so that the cost is greatly lowered.

The present invention can be best understood through the following description and accompanying drawings wherein:

DETAILED DESCRIPTION OF THE PREFERRED EMBODIMENTS

Figure 2:
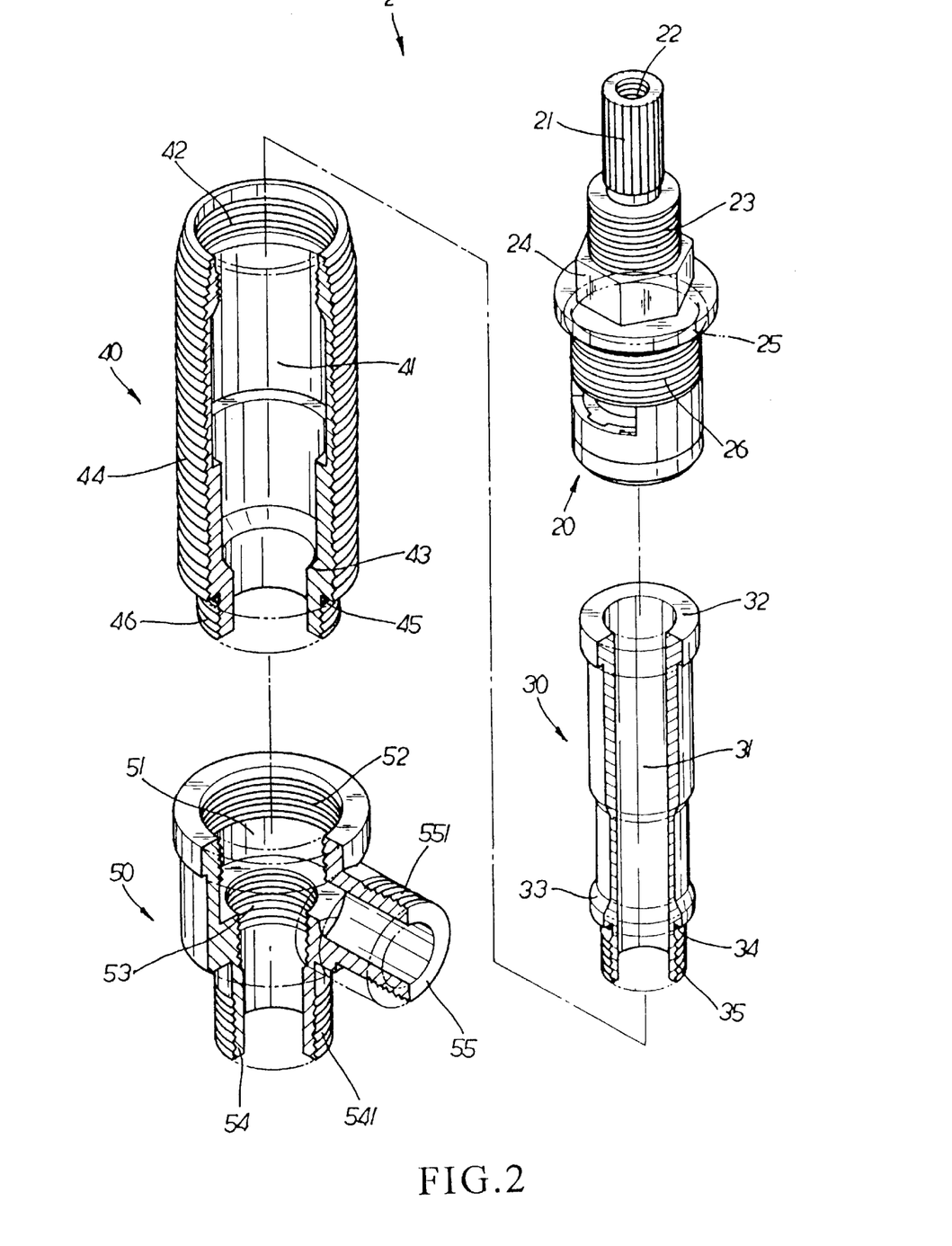
FIG. 2 is a perspective exploded view of the faucet valve chamber body of the present invention.
Figure 3:
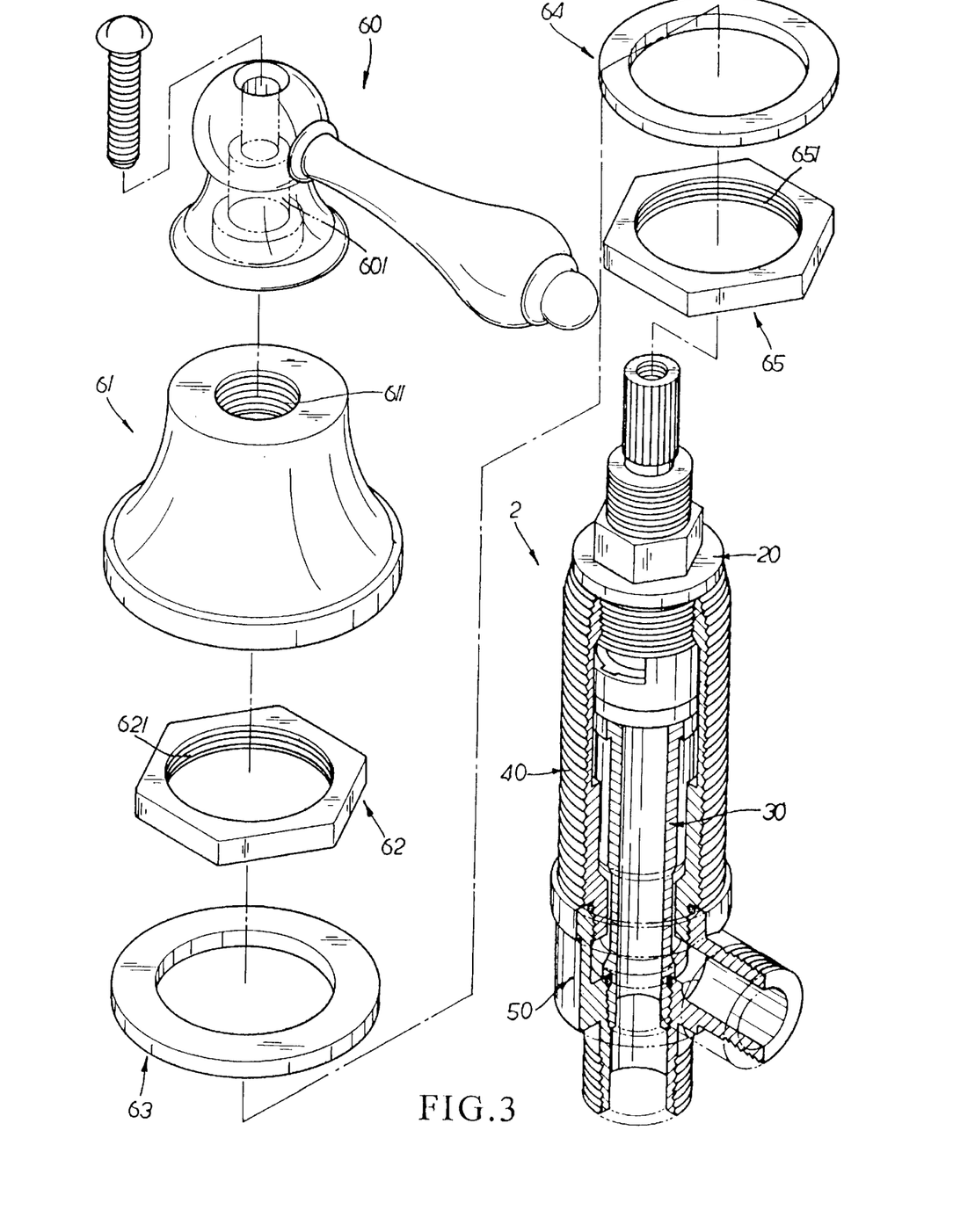
FIG. 3 is a sectional partially exploded view of the faucet valve chamber body of the present invention.

Please refer to FIGS. 2 and 3. The valve chamber body 2 of the present invention is composed of a controlling valve body 20, an inlet tube 30, a main tube body 40 and an outlet/inlet sleeve 50. The valve chamber body 2 is assembled with a handle 60, a casing 61, an upper clamping block 62, a washer 63, a sealing ring 64 and a lower clamping block 64. The upper end of the controlling valve body 20 is provided with a driving rod 21 having toothed circumference. The driving rod 21 serves to drive a controlling enamel chip to control incoming/outgoing of the water. The top end is formed with a small thread hole 22. The lower side of the driving rod is sequentially milled with a casing outer thread section 23 and a stepped stop block 24 with smaller upper section and larger lower section. A sealing ring 25 is fitted under the large diameter section of the stop block 24. A lower portion of the controlling valve body 20 under the sealing ring 25 is further milled with a locking outer thread section 26. The inlet tube 30 is made of a copper bar by milling and formed with an internal inlet tunnel 31. The outer circumference of upper end of the inlet tube 30 is formed with an annular engaging section 32 with larger diameter. The middle portion is milled to form a stepped section. An annular flow-guiding rib 33 with larger diameter is adjacent to lower side of the stepped section. A water-sealing ring 34 is fitted under the flow-guiding rib 33. The lower end of the inlet tube 30 under the flow-guiding rib 33 is milled with locking outer thread section 35. The main tube body 40 is also made of a copper bar by milling and formed with an internal receiving tunnel 41. The inner circumference of the upper end of the receiving tunnel 41 is formed with a locking inner thread section 42. Near lower end of the receiving tunnel 41, the inner circumference of the receiving tunnel 41 is formed with an annular stop section 43. The outer circumference of the main tube body 40 is formed with a main outer thread section 44 with a certain length. The lower side of the main outer thread section 44 is formed with a small diameter section milled with a fastening outer thread section 46. A water-sealing ring 45 is fitted on the small diameter section. The outlet/inlet sleeve 50 is made by pressing cast. The center thereof is formed with a stepped adapting flow passage 51. The opening of the large diameter section of the adapting flow passage 51 is formed with a fastening inner thread section 52 and the small diameter section thereof is formed with a locking inner thread section 53. A lower side of the outlet/inlet sleeve 50 is formed with an inlet tube 54 and a lateral side thereof is formed with an outlet tube 55. The inlet tube 54 and the outlet tube 55 both communicate with the adapting flow passage 51. In addition, the outer circumference of the end of the inlet tube 54 is formed with an outlet thread section 541, while the outer circumference of the end of the outlet tube 55 is formed with an outlet outer thread section 551. A lever extends from one end of the handle 60. The top of the handle 60 is formed with a stepped hole. The circumference of the large diameter section of the stepped hole is toothed to form a driving hole 601. The top of the casing 61 is formed with a casing thread hole 611. The upper and lower clamping blocks 62, 65 are formed with central main thread holes 621, 651.

When assembled, as shown in FIG. 3, the inlet tube 30 is first fitted into the receiving tunnel 41 of the main tube body 40 with the engaging section 32 engaged with the stop section 42 of main tube body 40. At this time, the inlet tube 30 is preliminarily assembled with the main tube body 40 with the locking outer thread section 35 of the inlet tube 30 extending out of the main tube body 40 to be screwed with the locking inner thread section 53 of the outlet/inlet sleeve 50. The locking outer thread section 47 of the main tube body 40 is screwed with the fastening inner thread section 52 of the outlet/inlet sleeve 50. Under such circumstance, the inlet tube 30, main tube body 40 and the outlet/inlet sleeve 50 are integrally associated together. Finally, the locking outer thread section 26 of the controlling valve body 20 is screwed with the locking inner thread section 42 of the main tube body 40 to complete the assembly of the valve chamber body 2.

Figure 4:
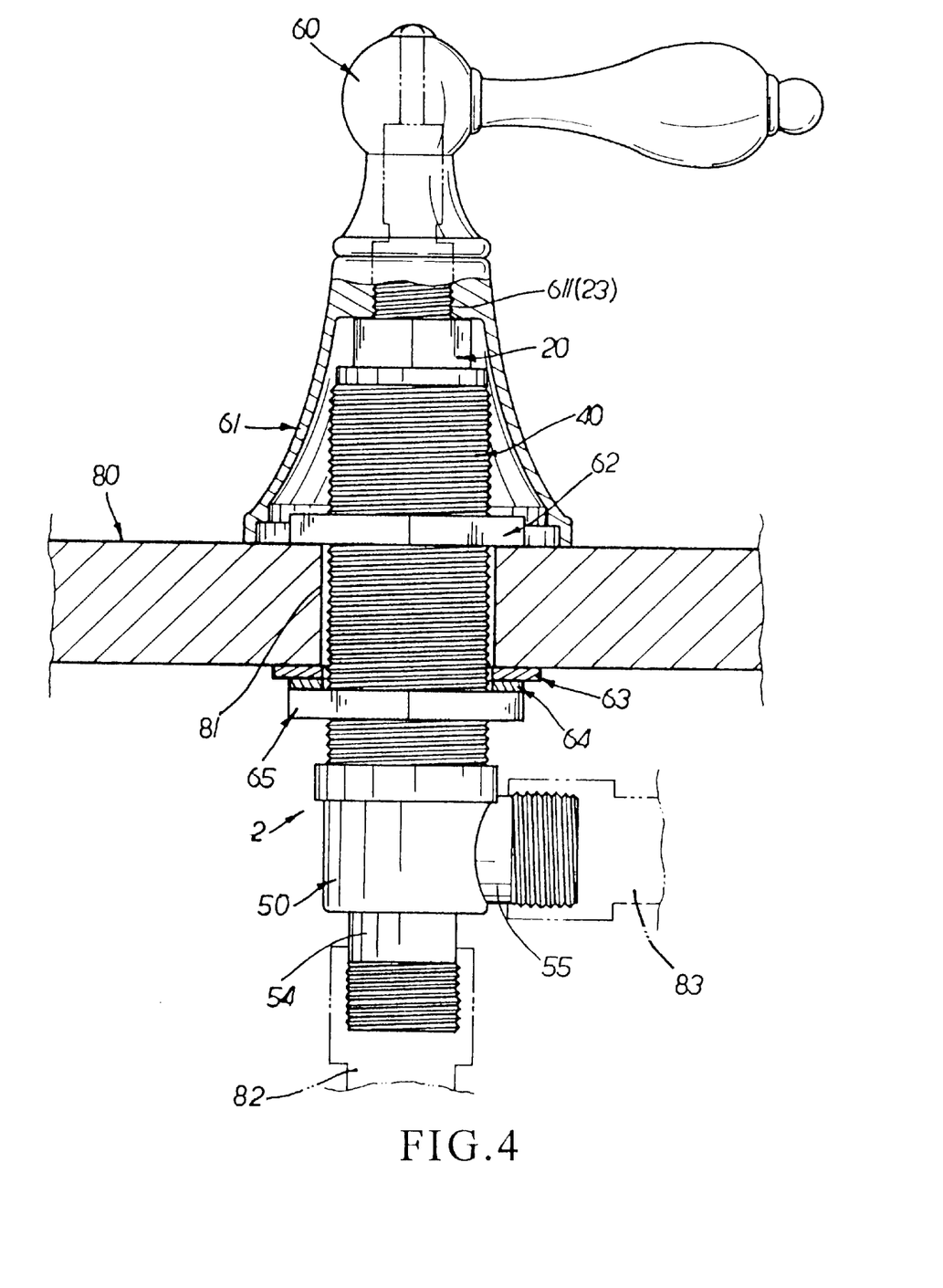
FIG. 4 is a sectional assembled view of the faucet valve chamber body of the present invention mounted on a bath tub or washing basin.

When mounting the valve chamber body 20 on a bath tub or a washing basin 70 (with reference to FIG. 4), first the main inner thread 651 of the lower clamping block 65 is screwed with the main outer thread section 44 of the valve chamber body 2 at a certain height. The sealing ring 64 and the washer 63 are sequentially fitted around the main outer thread section 44 of the valve chamber body 2 with the lower face of the sealing ring 64 attaching to the upper face of the lower clamping block 65. Then, the valve chamber body 2 is upward passed through the perforation 81 of the bath tub or washing basin 80 and extended beyond upper side thereof by a certain length. At this time, the upper face of the washer 63 attaches to the lower side of the bath tub or the washing basin 80. Then, the main inner thread section 621 of the upper clamping block 62 is screwed and tightened with the main outer thread section 44 extending out of the upper side of the bath tub or washing basin 80. Under such circumstance, the valve chamber body 2 is clamped and locked by the upper and lower clamping blocks 62, 65 on the bath tub or washing basin 80. Then the casing 61 is fitted onto the controlling valve 20 of the valve chamber body 2 with the casing outer thread section 23 screwed with the casing thread hole 611 of the casing 61. The driving rod 21 extends through the casing thread hole 611 beyond the upper end of the casing 61. The lower end of the casing 61 is totally attached to the upper face of the bath tub or washing basin 80. Then, the driving rod 21 of the controlling valve body 20 is inserted into and engaged with the driving hole 601 of the handle 60. A screw is passed through the driving hole 601 of the handle 60 and screwed into a small thread hole 22 of the controlling valve body 20. At this time, by means of turning the handle 60, the driving rod 21 is driven to drive the controlling enamel chip for controlling incoming/outgoing of the water. Finally, the inlet tube 82 and outlet tube 83 of the bath tub or washing basin 80 are respectively connected with the inlet tube 54 and outlet tube 55 of the valve chamber body 2. The other end of the inlet tube 82 is connected to a water source, while the other end of the outlet tube 83 is connected with the faucet.

Figure 5:
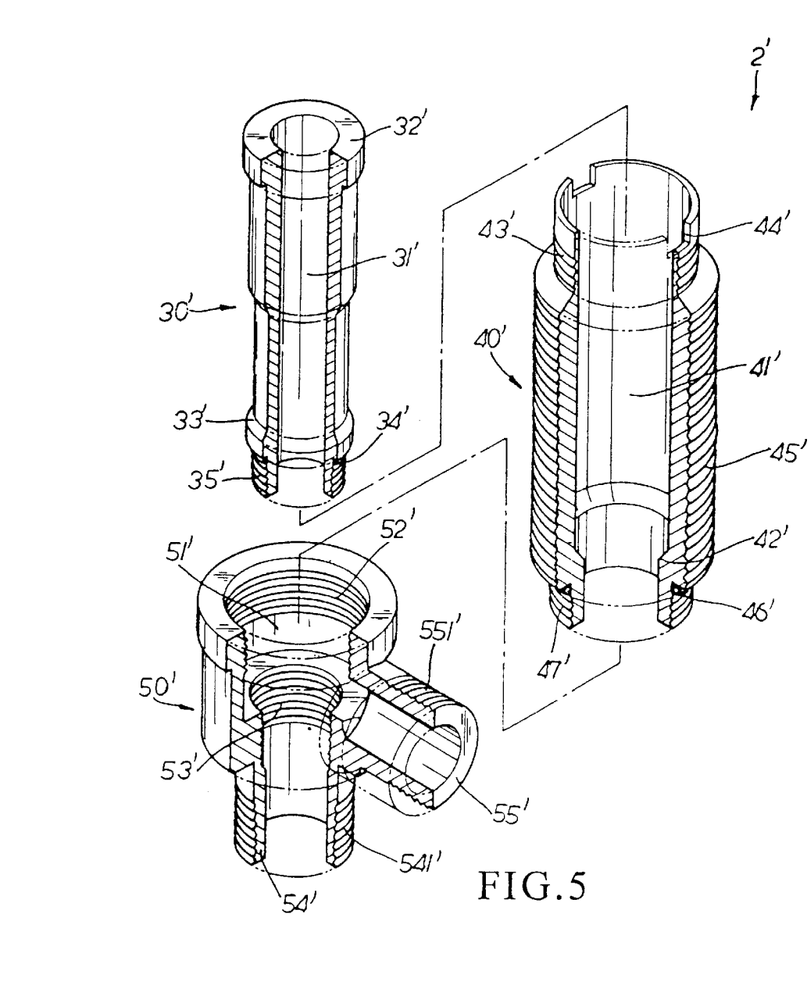
FIG. 5 is a perspective exploded view of another embodiment of the faucet valve chamber body of the present invention.
Figure 6:
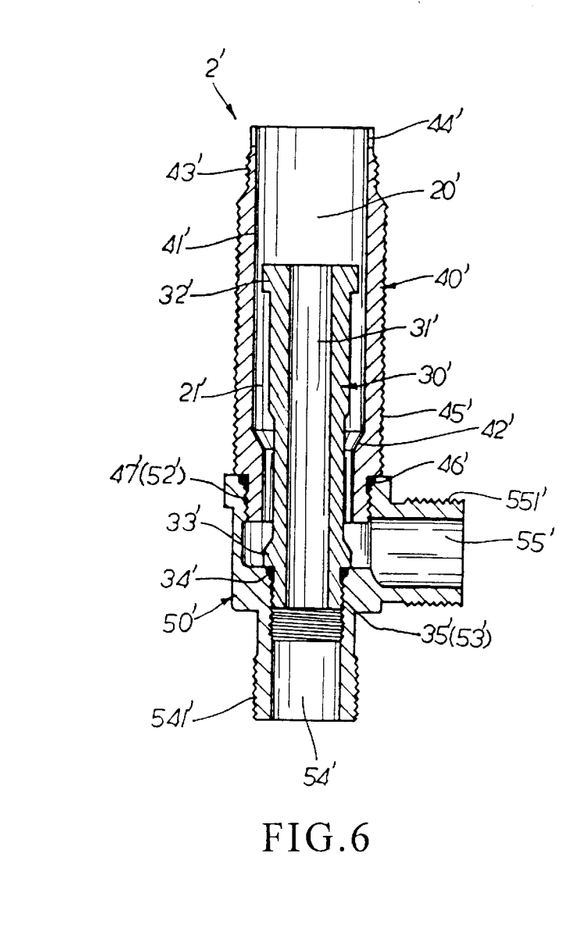
FIG. 6 is a sectional assembled view of the other embodiment of the faucet valve chamber body of the present invention.

FIG. 5 shows another embodiment of the present invention, in which the controlling valve body 20 is omitted. Instead, the valve chamber body 2' is composed of an inlet tube 30', a main tube body 40' and an outlet/inlet sleeve 50'. The valve chamber body 2' is assembled with a handle seat 70, an upper clamping block 71, a resilient washer 72, a sealing ring 73, a lower clamping block 74, a fitting cap 75 and a controlling valve 76 (with reference to FIG. 1). The inlet tube 30' is made of a copper bar by milling and formed with an internal inlet tunnel 31'. The outer circumference of upper end of the inlet tube 30' is formed with an annular engaging section 32' with larger diameter. The middle portion is milled to form a stepped section. An annular flow-guiding rib 33' with larger diameter is adjacent to lower side of the stepped section. A water-sealing ring 34' is fitted under the flow-guiding rib 33'. The lower end of the inlet tube 30' under the flow-guiding rib 33' is milled with locking outer thread section 35'. The main tube body 40' is also made of a copper bar by milling and formed with an internal receiving tunnel 41'. The inner circumference of the receiving tunnel 41' near lower end thereof is formed with an annular stop section 42'. The outer circumference of upper end of the main tube body 40' is formed with an outer thread section 43' with smaller diameter. The edge of-the upper opening is cut with two opposite locating notches 44'. The middle portion of the main tube body 40' is formed with a main outer thread section 45' with a certain length. The lower end of the main tube body 40' under the main outer thread section 45' is a small diameter section milled with fastening outer thread section 47'. A water-sealing ring 46 is fitted on the small diameter section. The outlet/inlet sleeve 50' is made by pressing cast. The center thereof is formed with a stepped adapting flow passage 51'. The opening of the large diameter section of the adapting flow passage 51' is formed with a fastening inner thread section 52' and the small diameter section thereof is formed with a locking inner thread section 53'. A lower side of the outlet/inlet sleeve 50' is formed with an inlet tube 54' and a lateral side thereof is formed with an outlet tube 55'. The inlet tube 54 and the outlet tube 55 both communicate with the adapting flow passage 51. In addition, the outer circumference of the end of the inlet tube 54 is formed with an inlet outer thread section 541', while the outer circumference of the end of the outlet tube 55' is formed with an outlet outer thread section 551'.

When assembled, as shown in FIG. 3, the inlet tube 30' is first fitted into the receiving tunnel 41' of the main tube body 40' with the engaging section 32' engaged with the stop section 42' of main tube body 40'. At this time, the inlet tube 30' is preliminarily assembled with the main tube body 40' with the locking outer thread section 35' of the inlet tube 30' extending out of the main tube body 40' to be screwed with the locking inner thread section 53' of the outlet/inlet sleeve 50'. The locking outer thread section 47' of the main tube body 40' is screwed with the fastening inner thread section 52' of the outlet/inlet sleeve 50'. Under such circumstance, the inlet tube 30', main tube body 40' and the outlet/inlet sleeve 50' are integrally associated together. A valve chamber 21' with a certain depth is defined between the upper end of the engaging section 32' of the inlet tube 30' and the upper opening of the receiving tunnel 41' of the main tube body 40'. Also, an annular outlet passage 22' with a certain size is defined between the outer circumferential wall of the inlet tube 30' and the inner circumferential walls of the main tube body 40' and the large diameter section of the outlet/inlet sleeve 50'. At this moment, the valve chamber body 2' is completely assembled.

Figure 7:
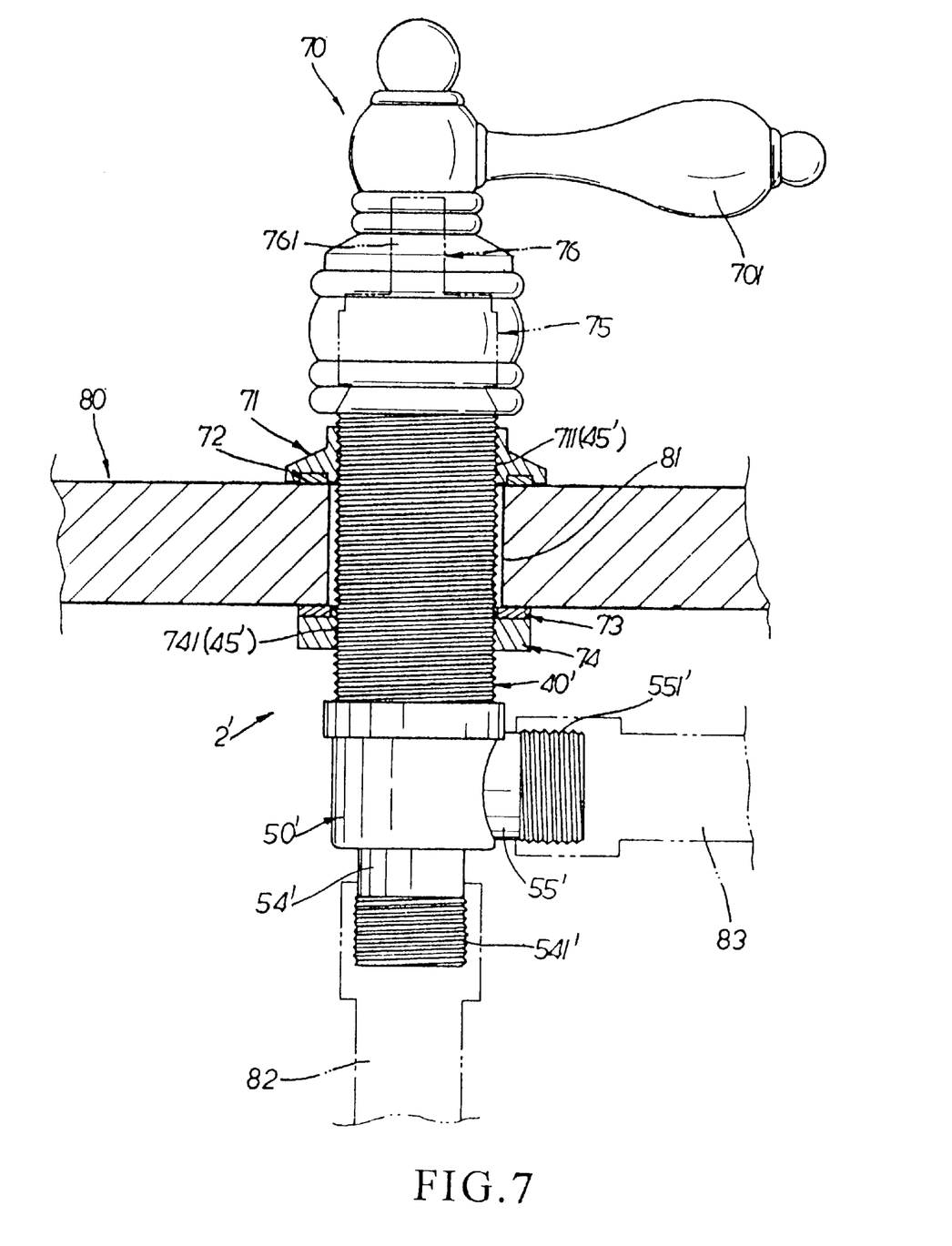
FIG. 7 is a sectional assembled view of the other embodiment of the faucet valve chamber body of the present invention mounted on a bath tub or washing basin.

When mounting the valve chamber body 2' on a bath tub or a washing basin 80 (with reference to FIG. 7), first the main inner thread 741 of the lower clamping block 74 is screwed with the main outer thread section 44' of the valve chamber body 2' at a certain height. The sealing ring 73 is fitted around the main outer thread section 45' of the valve chamber body 2' with its lower face attaching to the upper face of the lower clamping block 74. Then, the valve chamber body 2' is upward passed through the perforation 81 of the bath tub or washing basin 80 and extended beyond upper side thereof by a certain length. At this time, the upper face of the sealing ring 73 attaches to the lower side of the bath tub or the washing basin 80. Then, the resilient washer 72 is fitted around the main outer thread section 45' of the valve chamber body 2'. The main inner thread section 711 of the upper clamping block 71 is screwed and tightened with the main outer thread section 45' extending out of the upper side of the bath tub or washing basin 80. Under such circumstance, the valve chamber body 2' is clamped and locked by the upper and lower clamping blocks 71, 74 on the bath tub or washing basin 80. Then the lower end of the controlling valve 76 is fitted into the valve chamber 21' of the valve chamber body 2' with the locating projecting blocks 762 retained in the locating notches 44'. Then, the inner thread section 751 of the fitting cap 75 is screwed on the outer thread section 43' of the valve chamber body 2' with the lower face of the small diameter section of the fitting cap 75 attaching to the upper face of the controlling valve 76. The fitting cap 75 locks and prevents the controlling valve 76 from detaching from the valve chamber body 2'. The controlling boss 761 extends beyond the fitting cap 75 and the handle seat 70 is fitted onto the upper end of the valve chamber body 2' with the controlling boss 761 ' inserted into the controlling cavity 702. By means of turning the handle seat 70, the controlling valve 76 is driven to shut off the water or discharge the water. Finally, the inlet tube, 82 and outlet tube 83 of the bath tub or washing basin 80 are respectively connected with the inlet tube 54' and outlet tube 55' of the valve chamber body 2'. The other end of the inlet tube 82 is connected to a water source, while the other end of the outlet tube 83 is connected with the faucet.

According to the above arrangement, the present invention has the following advantages:

1. The inlet tube 30 and the main tube body 40 are both made by milling. Therefore, the inner and outer surfaces thereof are polished faces without roughness so that the water flow will not be affected and the water can be smoothly discharged.
2. The inlet tube 30 and the main tube body 40 are both made by milling. Therefore, the inner and outer surfaces thereof are free from any sand hole as resulted from casting. Therefore, when the water is shut off, the water is prevented from leaking from the sand holes.
3. The inlet tube 30, the main tube body 40 and the outlet/inlet sleeve 50 of the valve chamber body 2 are first respectively processed and then assembled. Therefore, prior to assembly, these parts can be visually entirely checked. Therefore, defective products can be sorted.
4. When mounting the valve chamber body 2 on bath tubs or washing basins 80 with different wall thickness, it is only necessary to mill the inlet tube 30 and main tube body 40 with a length meeting the wall thickness thereof. Therefore, it is unnecessary to manufacture a number of molds so that the cost is greatly lowered.

5. The lower end of the casing 61 is totally attached to the upper face of the bath tub or washing basin 80. Therefore, when the handle 60 is damaged and needs to be replaced, it is unnecessary to replace the upper clamping block 62 together. Therefore, the valve chamber body 2 is prevented from dropping due to replacement of the upper clamping block 62 so that the replacement is simplified.

6. When the handle 60 is damaged and needs to be replaced, it is unnecessary to replace the upper clamping block 62 together. Therefore, the cost is reduced and the resource will not be wasted.

The above embodiments are only used to illustrate the present invention, not intended to limit the scope thereof. Many modifications of the above embodiments can be made without departing from the spirit of the present invention.

What is claimed is:

1. Faucet valve chamber body comprising a controlling valve body, an inlet tube, a main tube body and an outlet/inlet sleeve, the valve chamber body being assembled with a handle, a casing, an upper clamping block, a washer, a sealing ring and a lower clamping block, the top of the handle being formed with a stepped hole, the circumference of the large diameter section of the stepped hole being toothed to form a driving hole, the top of the casing being formed with a casing thread hole, the upper and lower clamping blocks being formed with central main thread holes, said faucet valve chamber body being characterized in that:

an upper end of the controlling valve body is provided with a driving rod having toothed circumference, a top end of the driving rod being formed with a small thread hole, a lower side of the driving rod being sequentially milled with a casing outer thread section and a stepped stop block, a sealing ring being fitted under the large diameter section of the stop block, a lower portion of the controlling valve body under the sealing ring being further milled with a locking outer thread section;

the inlet tube is made of a copper bar by milling and formed with an internal inlet tunnel, an outer circumference of upper end of the inlet tube being formed with an annular engaging section, a middle portion being milled to form a stepped section, an annular flow-guiding rib being adjacent to lower side of the stepped section, a water-sealing ring being fitted under the flow-guiding rib, a lower end of the inlet tube under the flow-guiding rib being milled with locking outer thread section;

the main tube body is also made of a copper bar by milling and formed with an internal receiving tunnel, an inner circumference of the upper end of the receiving tunnel being formed with a locking inner thread section, near lower end of the receiving tunnel, the inner circumference of the receiving tunnel being formed with an annular stop section, an outer circumference of the main tube body being formed with a main outer thread section, a lower side of the main outer thread section being formed with a small diameter section milled with a fastening outer thread section, a water-sealing ring being fitted on the small diameter section; and the outlet/inlet sleeve is made by pressing cast, a center thereof being formed with a stepped adapting flow passage, an opening of the large diameter section of the adapting flow passage being formed with a fastening inner thread section and the small diameter section thereof being formed with a locking inner thread section, a lower side of the outlet/inlet sleeve being formed with an inlet tube and a lateral side thereof being formed with an outlet tube, the inlet tube and the out let tube both communicating with the adapting flow passage, an outer circumference of the end of the inlet tube being formed with an inlet outer thread section, while an outer circumference of the end of the outlet tube being formed with an outlet outer thread section, the inlet tube being fitted in the receiving tunnel of the main tube body with the locking outer thread section of the inlet tube extending out of the main tube body to be screwed with the locking inner thread section of the outlet/inlet sleeve, then, the fastening outer thread section of the main tube body being screwed with the fastening inner thread section of the outlet/inlet sleeve, the locking outer thread section of the controlling valve body being screwed with the locking inner thread section of the main tube body.

2. Faucet valve chamber body as claimed in claim 1, wherein the controlling valve body is omitted and the valve chamber body is composed of an inlet tube, a main tube body and an outlet/inlet sleeve, the valve chamber body being assembled with a handle seat, an upper clamping block, a resilient washer, a sealing ring, a lower clamping block, a fitting cap and a controlling valve.

3. Faucet valve chamber body as claimed in claim 1, wherein the engaging section of the inlet tube is first engaged with the stop section of the main tube body, whereby the inlet tube is preliminarily located in the main tube body.

* * * * *